United States Patent
Al-Qaq et al.

(10) Patent No.: US 8,009,762 B1
(45) Date of Patent: Aug. 30, 2011

(54) METHOD FOR CALIBRATING A PHASE DISTORTION COMPENSATED POLAR MODULATED RADIO FREQUENCY TRANSMITTER

(75) Inventors: Wael A. Al-Qaq, Oak Ridge, NC (US); Dennis Mahoney, High Point, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 1169 days.

(21) Appl. No.: 11/736,176

(22) Filed: Apr. 17, 2007

(51) Int. Cl.
*H04L 25/49* (2006.01)
*H04B 1/04* (2006.01)

(52) U.S. Cl. .................................. 375/296; 455/114.3
(58) Field of Classification Search .............. 375/296, 375/297; 455/114.2, 114.3
See application file for complete search history.

(56) References Cited

U.S. PATENT DOCUMENTS

| | | | |
|---|---|---|---|
| 3,900,823 A | 8/1975 | Sokal et al. |
| 4,389,618 A | 6/1983 | Bauman |
| 4,609,881 A | 9/1986 | Wells |
| 4,837,786 A | 6/1989 | Gurantz et al. |
| 4,968,908 A | 11/1990 | Walls |
| 5,055,802 A | 10/1991 | Hietala et al. |
| 5,079,522 A | 1/1992 | Owen et al. |
| 5,313,411 A | 5/1994 | Tsujimoto |
| 5,430,416 A | 7/1995 | Black et al. |
| 5,444,415 A | 8/1995 | Dent et al. |
| 5,524,286 A | 6/1996 | Chiesa et al. |
| 5,598,436 A | 1/1997 | Brajal et al. |
| 5,608,353 A | 3/1997 | Pratt |
| 5,617,450 A | 4/1997 | Kakuishi et al. |
| 5,629,648 A | 5/1997 | Pratt |
| 5,822,011 A | 10/1998 | Rumreich |
| 5,900,778 A | 5/1999 | Stonick et al. |
| 5,952,895 A | 9/1999 | McCune, Jr. et al. |
| 6,008,703 A | 12/1999 | Perrott et al. |
| 6,101,224 A | 8/2000 | Lindoff et al. |
| 6,115,684 A | 9/2000 | Kawahara et al. |
| 6,130,579 A | 10/2000 | Iyer et al. |
| 6,141,390 A | 10/2000 | Cova |
| 6,191,656 B1 | 2/2001 | Nadler |
| 6,211,747 B1 | 4/2001 | Trichet et al. |
| 6,229,395 B1 | 5/2001 | Kay |
| 6,236,687 B1 | 5/2001 | Caso et al. |
| 6,236,703 B1 | 5/2001 | Riley |

(Continued)

OTHER PUBLICATIONS

Cusinato, Paolo, "Gain/Bandwidth Programmable PA Control Loop for GSM/GPRS Quad-Band Cellular Handsets," IEEE Journal of Solid-State Circuits, Jun. 2004, 960-966, vol. 39, No. 6, IEEE.

(Continued)

*Primary Examiner* — Dac V Ha
*Assistant Examiner* — Vineeta S Panwalkar
(74) *Attorney, Agent, or Firm* — Withrow & Terranova, P.L.L.C.

(57) ABSTRACT

The present invention is a method for calibrating a phase distortion compensated polar modulated RF transmitter, which uses amplitude pre-distortion to compensate for phase distortion, called AMPM compensation. Some embodiments of the present invention may include a method for calibrating polar modulated RF transmitters that use amplitude pre-distortion to compensate for amplitude non-linearities, called AMAM compensation. The AMPM and AMAM compensations may enable the polar modulated RF transmitter to conform to RF output power tolerances, meet EVM specifications, and meet ORFS requirements. The pre-distortion calibration methods may be used to determine calibration constants by measuring phase distortion and amplitude non-linearities. During normal operation, the calibration constants may be used to provide the AMPM and AMAM compensations.

20 Claims, 9 Drawing Sheets

U.S. PATENT DOCUMENTS

| | | | |
|---|---|---|---|
| 6,236,837 B1 | 5/2001 | Midya | |
| 6,240,278 B1 | 5/2001 | Midya et al. | |
| 6,246,286 B1 | 6/2001 | Persson | |
| 6,271,727 B1 | 8/2001 | Schmukler | |
| 6,275,685 B1 | 8/2001 | Wessel et al. | |
| 6,285,239 B1 | 9/2001 | Iyer et al. | |
| 6,288,610 B1 | 9/2001 | Miyashita | |
| 6,295,442 B1 | 9/2001 | Camp, Jr. et al. | |
| RE37,407 E | 10/2001 | Eisenberg et al. | |
| 6,307,364 B1 | 10/2001 | Augustine | |
| 6,329,809 B1 | 12/2001 | Dening et al. | |
| 6,335,767 B1 | 1/2002 | Twitchell et al. | |
| 6,356,150 B1 | 3/2002 | Spears et al. | |
| 6,359,950 B2 | 3/2002 | Gossmann et al. | |
| 6,366,177 B1 | 4/2002 | McCune et al. | |
| 6,377,784 B2 | 4/2002 | McCune | |
| 6,392,487 B1 | 5/2002 | Alexanian | |
| 6,417,731 B1 | 7/2002 | Funada et al. | |
| 6,462,617 B1 | 10/2002 | Kim | |
| 6,489,846 B2 | 12/2002 | Hatsugai | |
| 6,504,885 B1 | 1/2003 | Chen | |
| 6,522,121 B2 | 2/2003 | Coumou | |
| 6,581,082 B1 | 6/2003 | Opsahl | |
| 6,587,514 B1 | 7/2003 | Wright et al. | |
| 6,642,786 B1 | 11/2003 | Jin et al. | |
| 6,693,468 B2 | 2/2004 | Humphreys et al. | |
| 6,700,929 B1 | 3/2004 | Shan et al. | |
| 6,701,134 B1 | 3/2004 | Epperson | |
| 6,701,138 B2 | 3/2004 | Epperson et al. | |
| 6,720,831 B2 | 4/2004 | Dening et al. | |
| 6,724,252 B2 | 4/2004 | Ngo et al. | |
| 6,724,265 B2 | 4/2004 | Humphreys | |
| 6,724,831 B1 | 4/2004 | Hasegawa et al. | |
| 6,728,324 B1 | 4/2004 | Shan et al. | |
| 6,731,145 B1 | 5/2004 | Humphreys et al. | |
| 6,735,419 B2 | 5/2004 | Mitzlaff | |
| 6,748,204 B1 | 6/2004 | Razavi et al. | |
| 6,782,244 B2 | 8/2004 | Steel et al. | |
| 6,798,843 B1 | 9/2004 | Wright et al. | |
| 6,801,086 B1 | 10/2004 | Chandrasekaran | |
| 6,807,406 B1 | 10/2004 | Razavi et al. | |
| 6,816,718 B2 | 11/2004 | Yan et al. | |
| 6,819,914 B2 | 11/2004 | Yan et al. | |
| 6,819,941 B2 | 11/2004 | Dening et al. | |
| 6,831,506 B1 | 12/2004 | Moffat et al. | |
| 6,834,084 B2 | 12/2004 | Hietala | |
| 6,836,517 B2 | 12/2004 | Nagatani et al. | |
| 6,900,778 B1 | 5/2005 | Yamamoto | |
| 6,901,039 B1 | 5/2005 | Sugie et al. | |
| 6,901,514 B1 | 5/2005 | Iu et al. | |
| 6,903,604 B2 | 6/2005 | Kim | |
| 6,914,943 B2 | 7/2005 | Shimizu | |
| 6,975,688 B2 | 12/2005 | Rexberg et al. | |
| H2143 H | 2/2006 | Prockup | |
| 7,010,276 B2 | 3/2006 | Sander et al. | |
| 7,010,280 B1 | 3/2006 | Wilson | |
| 7,012,969 B2 | 3/2006 | Ode et al. | |
| 7,054,385 B2 | 5/2006 | Booth et al. | |
| 7,109,791 B1 | 9/2006 | Epperson et al. | |
| 7,113,036 B2 | 9/2006 | Moffatt et al. | |
| 7,113,551 B2 | 9/2006 | Sills et al. | |
| 7,158,494 B2 | 1/2007 | Sander et al. | |
| 7,349,490 B2 | 3/2008 | Hunton | |
| 7,369,813 B2 * | 5/2008 | Andersson | 455/67.11 |
| 7,457,586 B1 | 11/2008 | Hietala et al. | |
| 7,529,523 B1 | 5/2009 | Young et al. | |
| 7,542,520 B1 | 6/2009 | Estrada | |
| 7,593,698 B1 * | 9/2009 | Johnson et al. | 455/102 |
| 2001/0022532 A1 | 9/2001 | Dolman | |
| 2001/0033238 A1 | 10/2001 | Velazquez | |
| 2002/0008578 A1 | 1/2002 | Wright et al. | |
| 2002/0021764 A1 | 2/2002 | Posti | |
| 2002/0041210 A1 | 4/2002 | Booth et al. | |
| 2002/0044014 A1 | 4/2002 | Wright et al. | |
| 2002/0060606 A1 | 5/2002 | Andre | |
| 2002/0093378 A1 | 7/2002 | Nielsen et al. | |
| 2002/0113905 A1 | 8/2002 | Lee | |
| 2002/0160821 A1 | 10/2002 | Kaikati et al. | |
| 2002/0167923 A1 | 11/2002 | Sendonaris et al. | |
| 2003/0012289 A1 | 1/2003 | Lindoff | |
| 2003/0020538 A1 | 1/2003 | Kim | |
| 2003/0087617 A1 | 5/2003 | Shohara | |
| 2003/0133518 A1 | 7/2003 | Koomullil et al. | |
| 2003/0161487 A1 | 8/2003 | Husted et al. | |
| 2003/0179830 A1 | 9/2003 | Eidson et al. | |
| 2003/0197558 A1 | 10/2003 | Bauder et al. | |
| 2003/0197559 A1 | 10/2003 | Ghannouchi et al. | |
| 2003/0215025 A1 | 11/2003 | Hietala | |
| 2003/0215026 A1 * | 11/2003 | Hietala | 375/297 |
| 2003/0227342 A1 | 12/2003 | Liu | |
| 2004/0072597 A1 | 4/2004 | Epperson et al. | |
| 2004/0121741 A1 | 6/2004 | Rashev et al. | |
| 2004/0131129 A1 | 7/2004 | Harron et al. | |
| 2004/0183511 A1 | 9/2004 | Dening | |
| 2004/0198414 A1 | 10/2004 | Hunton | |
| 2004/0208157 A1 | 10/2004 | Sander et al. | |
| 2005/0002470 A1 | 1/2005 | Saed et al. | |
| 2005/0018765 A1 | 1/2005 | Endres et al. | |
| 2005/0156662 A1 * | 7/2005 | Raghupathy et al. | 330/10 |
| 2005/0195919 A1 | 9/2005 | Cova | |
| 2006/0071711 A1 * | 4/2006 | Persson et al. | 330/149 |
| 2006/0178120 A1 * | 8/2006 | Puma | 455/114.3 |
| 2006/0203899 A1 | 9/2006 | Gee | |
| 2006/0280502 A1 | 12/2006 | Sekine et al. | |
| 2007/0110199 A1 | 5/2007 | Momtaz et al. | |
| 2007/0190952 A1 | 8/2007 | Waheed et al. | |
| 2008/0219332 A1 | 9/2008 | Brehler | |
| 2008/0310617 A1 | 12/2008 | Daecke et al. | |
| 2009/0252255 A1 | 10/2009 | Lee et al. | |

OTHER PUBLICATIONS

Notice of Allowance from U.S. Appl. No. 10/139,560 mailed Sep. 23, 2004.

Non-Final Rejection from from U.S. Appl. No. 10/139,560 mailed Jul. 9, 2003.

Final Rejection from U.S. Appl. No. 10/147,569 mailed Feb. 2, 2010.

Non-Final Rejection from U.S. Appl. No. 10/147,569 mailed May 12, 2009.

Final Rejection from U.S. Appl. No. 10/147,569 mailed Sep. 4, 2008.

Non-Final Rejection from U.S. Appl. No. 10/147,569 mailed Feb. 21, 2008.

Final Rejection from U.S. Appl. No. 10/147,569 mailed Mar. 8, 2006.

Non-Final Rejection from U.S. Appl. No. 10/147,569 mailed Sep. 20, 2005.

Final Rejection from U.S. Appl. No. 10/147,579 mailed Feb. 2, 2010.

Non-Final Rejection from U.S. Appl. No. 10/147,579 mailed Aug. 17, 2009.

Final Rejection from U.S. Appl. No. 10/147,579 mailed Apr. 1, 2009.

Non-Final Rejection from U.S. Appl. No. 10/147,579 mailed Oct. 1, 2008.

Final Rejection from U.S. Appl. No. 10/147,579 mailed Apr. 29, 2008.

Non-Final Rejection from U.S. Appl. No. 10/147,579 mailed Oct. 30, 2007.

Final Rejection from U.S. Appl. No. 10/147,579 mailed May 17, 2007.

Non-Final Rejection from U.S. Appl. No. 10/147,579 mailed Dec. 29, 2006.

Final Rejection from U.S. Appl. No. 10/147,579 mailed Mar. 16, 2006.

Non-Final Rejection from U.S. Appl. No. 10/147,579 mailed Sep. 20, 2005.

Non-Final Rejection from U.S. Appl. No. 10/874,509 mailed Aug. 4, 2008.

Non-Final Rejection from U.S. Appl. No. 10/874,509 mailed Oct. 17, 2007.

Non-Final Rejection from U.S. Appl. No. 11/847,044 mailed Dec. 24, 2008.

Non-Final Rejection from U.S. Appl. No. 11/847,044 mailed Apr. 16, 2008.

Notice of Allowance from U.S. Appl. No. 10/859,718 mailed Jun. 14, 2007.

Notice of Allowance from U.S. Appl. No. 11/209,435 mailed Dec. 9, 2008.
Examiner's Answer to Appeal Brief from U.S. Appl. No. 11/151,022 mailed Dec. 12, 2008.
Final Rejection from U.S. Appl. No. 11/151,022 mailed Apr. 15, 2008.
Non-Final Rejection from U.S. Appl. No. 11/151,022 mailed Oct. 3, 2007.
Final Rejection from U.S. Appl. No. 11/195,379 mailed Jan. 26, 2009.
Non-Final Rejection from U.S. Appl. No. 11/195,379 mailed Jul. 21, 2008.
Notice of Allowance from U.S. Appl. No. 11/347,957 mailed Jun. 25, 2010.
Non-Final Rejection from U.S. Appl. No. 11/347,957 mailed Dec. 24, 2009.
Non-Final Rejection from U.S. Appl. No. 11/347,957 mailed Mar. 30, 2009.
Notice of Allowance from U.S. Appl. No. 11/392,053 mailed May 26, 2009.
Non-Final Rejection from U.S. Appl. No. 11/392,053 mailed Nov. 28, 2008.
Notice of Allowance from U.S. Appl. No. 11/548,876 mailed Nov. 16, 2009.
Non-Final Rejection from U.S. Appl. No. 11/548,876 mailed Mar. 31, 2009.
Non-Final Rejection from U.S. Appl. No. 11/736,131 mailed Apr. 1, 2010.
Andraka, Ray, "A Survey of CORDIC Algorithms for FPGA Based Computers," Association for Computing Machinery, 0-89791-978-5, Feb. 1998.
Johnson, Jackie, "Power Amplifier Design for Open Loop EDGE Large Signal Polar Modulation Systems," RFDesign, Jun. 2006, pp. 42-50.
Pinto et al., "Phase Distortion and Error Vector Magnitude for 8-PSK Systems," London Communications Symposium, Sep. 14-15, 2000, University College London, London, England.
Volder, Jack E., "The CORDIC Trigonometric Computing Technique," IRE Trans. On Elect. Computers p. 330, Sep. 1959.

* cited by examiner

METHOD FOR CALIBRATING A PHASE DISTORTION COMPENSATED POLAR MODULATED RADIO FREQUENCY TRANSMITTER

CROSS REFERENCE TO RELATED APPLICATIONS

This application is related to U.S. patent application Ser. No. 11/736,131 entitled PHASE DISTORTION COMPENSATION USING AMPLITUDE PRE-DISTORTION IN A POLAR MODULATED RADIO FREQUENCY TRANSMITTER, which is concurrently filed herewith and incorporated by reference in its entirety.

FIELD OF THE INVENTION

The present invention relates to radio frequency (RF) transmitters used in RF communications systems.

BACKGROUND OF THE INVENTION

With the growth of the wireless communications industry, wireless communications protocols become more sophisticated and demanding in their requirements for complex modulation schemes and narrow channel bandwidths. The ultimate goal is to encode as much digital information as possible in a given channel. One such modulation scheme for encoding digital information is polar modulation. Polar modulated RF transmitters utilize both amplitude modulation (AM) and phase modulation (PM) to maximize the amount of information that can be encoded with minimum bandwidth. By using multiple combinations of phase and amplitude modulation, multiple digital bits of information can be represented. Large signal amplitude modulation allows several distinct levels of modulation with adequate noise margins for reliable encoding of digital data. One such polar modulation technique is called 8 Phase Shift Keying (8-PSK).

In a polar modulated system, large signal amplitude modulation can affect proper operation of phase modulated signals. In addition, large signal amplitude modulation may have non-linearities in the relationship between an amplitude control signal and output power. Actual output power must stay within specified tolerances. One measure of merit in a polar modulated transmitter is called Error Vector Magnitude (EVM), which represents the error between actual polar modulated output signals and ideal polar modulated output signals. For reliable operation in some polar modulated systems, certain EVM values must be maintained within maximum specifications. In addition, the bandwidth of transmitted polar modulated RF signals must be contained within a single channel, and not interfere with adjacent channels. Output Radio Frequency Spectrum (ORFS) is a measure of adjacent channel interference, which must be maintained within maximum specifications. Thus, there is a need for a polar modulated RF transmitter that conforms to RF output power tolerances, meets EVM maximum specifications, and meets ORFS requirements.

SUMMARY OF THE INVENTION

The present invention is a method for calibrating a phase distortion compensated polar modulated RF transmitter, which uses amplitude pre-distortion to compensate for phase distortion, called AMPM compensation. Some embodiments of the present invention may include a method for calibrating polar modulated RF transmitters that use amplitude pre-distortion to compensate for amplitude non-linearities, called AMAM compensation. The AMPM and AMAM compensations may enable the polar modulated RF transmitter to conform to RF output power tolerances, meet EVM maximum specifications, and meet ORFS requirements. The pre-distortion calibration methods may be used to determine calibration constants by measuring phase distortion and amplitude non-linearities. During normal operation, the calibration constants may be used to provide the AMPM and AMAM compensations.

In certain embodiments of the present invention, the calibration constants may include pre-distortion coefficients that may be used with polynomials. The calibration constants may reside natively with the RF transmitter or may be provided from an external source. The AM and PM compensations may be used to compensate for any sources of error, including but not limited to the basic transfer function of the polar modulated RF transmitter, average noise, instantaneous noise, temperature drift, aging, amplitude noise, phase noise, digital-to-analog converter noise, power amplifier effects, phase-locked loop (PLL) distortions or effects, or other circuit component interactions or effects. Certain PLL distortions are known in advance and may be used to simplify the pre-distortion calibration method.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a phase distortion compensated polar modulated RF transmitter, which uses amplitude pre-distortion to compensate for phase distortion, called AMPM compensation. Some embodiments of the present invention may use amplitude pre-distortion to compensate for amplitude non-linearities, called AMAM compensation. The AMPM and AMAM compensations may enable the polar modulated RF transmitter to conform to RF output power tolerances, meet EVM maximum specifications, and meet ORFS requirements. The present invention includes a pre-distortion calibration method for determining calibration constants. During the pre-distortion calibration method, phase distortion and amplitude non-linearities may be measured and calibration constants are determined. During normal operation, the calibration constants may be used to provide the AMPM and AMAM compensations.

In certain embodiments of the present invention, the calibration constants may include pre-distortion coefficients that may be used with polynomials. The calibration constants may reside natively with the RF transmitter or may be provided from an external source. The AM and PM compensations may be used to compensate for any sources of error, including but not limited to the basic transfer function of the polar modulated RF transmitter, average noise, instantaneous noise, temperature drift, aging, amplitude noise, phase noise, digital-to-analog converter noise, power amplifier effects, phase-locked loop (PLL) distortions or effects, or other circuit component interactions or effects. Certain PLL distortions are known in advance and may be used to simplify the pre-distortion calibration method.

In an exemplary embodiment of the present invention, a phase distortion and amplitude non-linearity compensated polar modulated RF transmitter is used in an Enhanced Data Rates for GSM Evolution (EDGE) communications system. GSM is an acronym for Global System for Mobile Communications. The RF transmitter may use at least one open loop polar modulator. The EDGE system may have adjacent channels, alternate channels, or both, separated from a transmitted channel. Alternate systems may have channels separated from an EDGE system transmitted channel. Any of these adjacent channels, alternate channels, or alternate system channels, may have aggressive ORFS requirements mandated by communications standards, such as those published by the European Telecommunications Standards Institute (ETSI). In one embodiment of the present invention, the adjacent channels, alternate channels, or alternate system channels may be separated from a transmitted channel by a difference of 400 Khz, −400 Khz, 600 Khz, or −600 Khz. In addition, the EDGE system may have aggressive EVM requirements. Therefore, AMAM compensation, AMPM compensation, or both may be needed. Polynomial pre-distortion coefficients may function as calibration constants.

Figure 1:
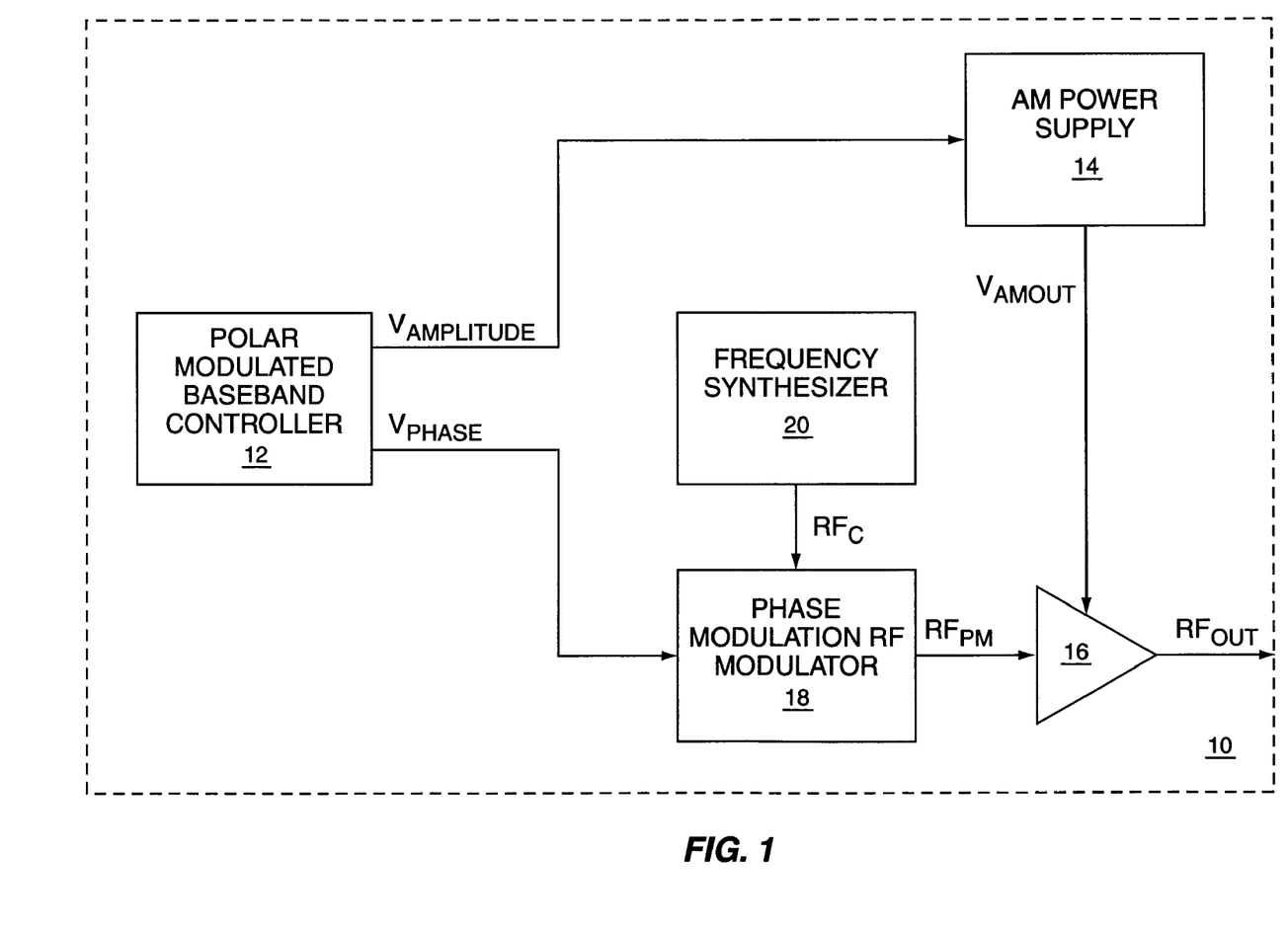
FIG. 1 shows a polar modulated RF transmitter.

FIG. 1 shows a polar modulated RF transmitter 10. A polar modulated baseband controller 12 provides an AM control signal $V_{AMPLITUDE}$ to an AM power supply 14, which provides an AM supply voltage $V_{AMOUT}$ to an RF power amplifier 16. The AM supply voltage $V_{AMOUT}$ may be proportional to the AM control signal $V_{AMPLITUDE}$. The AM power supply 14 may include DC-to-DC conversion circuitry instead of linear power supply circuitry to improve efficiency. The polar modulated baseband controller 12 provides a phase modulation control signal $V_{PHASE}$ to a phase modulation RF modulator 18, which provides a PM RF signal $RF_{PM}$ to the RF power amplifier 16. The PM control signal $V_{PHASE}$ is used to phase modulate an RF carrier signal $RF_C$ to create the PM RF signal $RF_{PM}$. A frequency synthesizer 20 provides the RF carrier signal $RF_C$ to the phase modulation RF modulator 18. The RF power amplifier 16 provides a polar modulated RF output signal $RF_{OUT}$. The carrier frequency of the polar modulated RF output signal $RF_{OUT}$ is essentially the frequency of the RF carrier signal $RF_C$. The AM portion of the RF output signal $RF_{OUT}$ is based on the AM supply voltage $V_{AMOUT}$. The PM portion of the RF output signal $RF_{OUT}$ is based on the PM RF signal $RF_{PM}$.

Figures 2A, 2B:
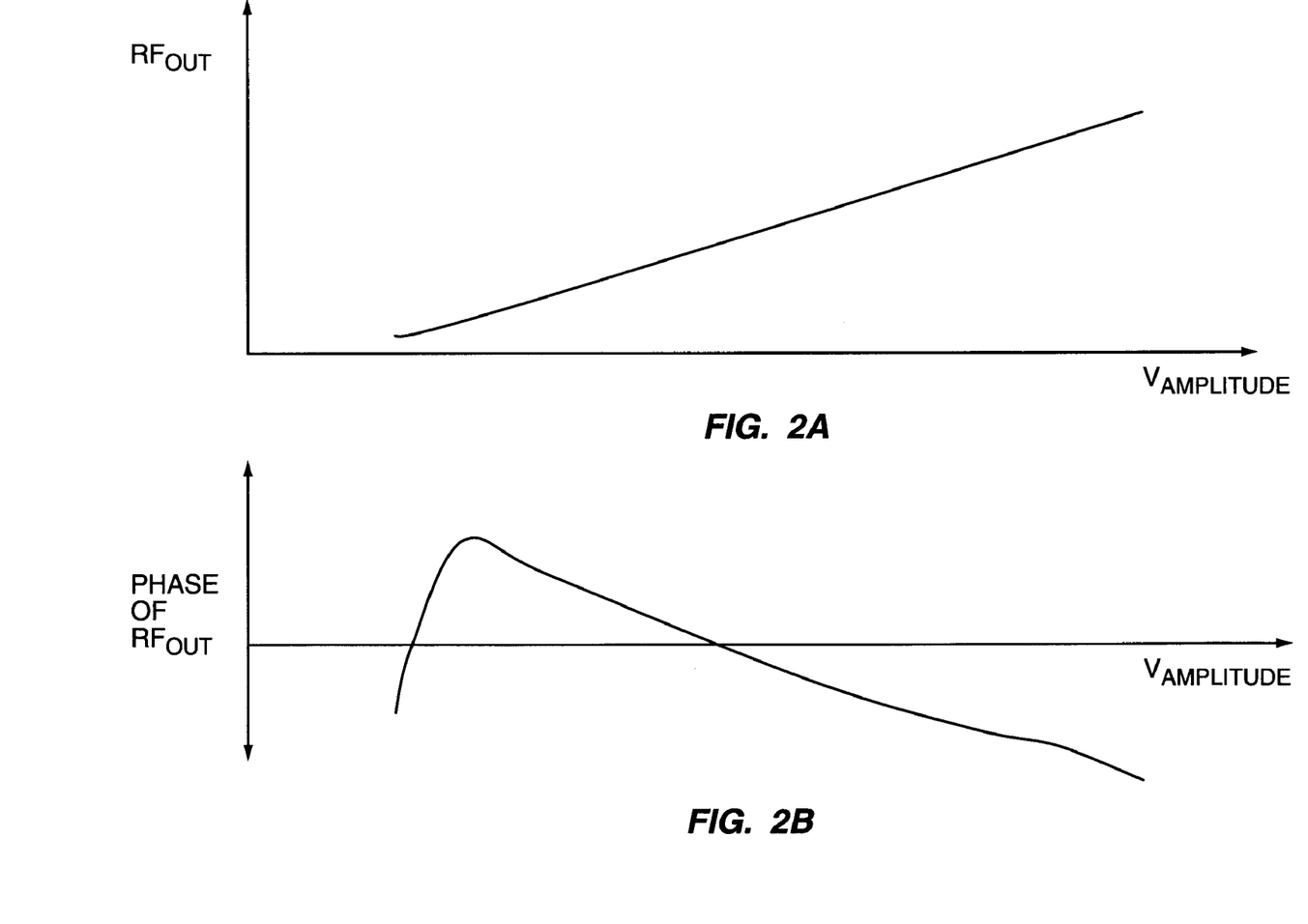
FIG. 2A shows the relationship of the RF output amplitude of the polar modulated RF transmitter illustrated in FIG. 1 to an amplitude modulation control signal.
FIG. 2B shows the relationship of the phase of the RF output of the polar modulated RF transmitter illustrated in FIG. 1 to the amplitude modulation control signal.

In an ideal polar modulated RF transmitter 10, the AM portion of the RF output signal $RF_{OUT}$ is proportional to the AM control signal $V_{AMPLITUDE}$; however, circuit characteristics may add offsets, non-linearities, or other anomalies. FIG. 2A shows the relationship of the AM portion of the RF output signal $RF_{OUT}$ of the polar modulated RF transmitter 10 illustrated in FIG. 1 to the AM control signal $V_{AMPLITUDE}$.

In an ideal polar modulated RF transmitter 10, the PM portion of the RF output signal $RF_{OUT}$ is not influenced by the AM control signal $V_{AMPLITUDE}$; however, circuit characteristics may enable interactions with the AM control signal $V_{AMPLITUDE}$. FIG. 2B shows the relationship of the phase of the RF output signal $RF_{OUT}$ of the polar modulated RF transmitter 10 illustrated in FIG. 1 to the AM control signal $V_{AMPLITUDE}$. Several points of inflection shown in this graph may increase the difficulty of meeting ORFS requirements. The PM portion of the RF output signal $RF_{OUT}$ is dependent on the AM control signal $V_{AMPLITUDE}$. Notably, the present invention relies on using AM signals to pre-distort PM signals to modify the behavior of the polar modulated RF transmitter 10, such as eliminating or modifying the points of inflection illustrated in FIG. 2B, compensating for noise or drift effects, compensating for PLL distortions, re-distributing the frequency spectrum of the RF output signal $RF_{OUT}$ to increase ORFS margins, or any combination thereof. In an exemplary embodiment of the present invention, ORFS requirements at +400 Khz, −400 Khz, +600 Khz, and −600 Khz from a transmit center frequency may be particularly stringent; therefore, re-distributing the frequency spectrum of the RF output signal $RF_{OUT}$ away from these particular frequencies to other frequencies where ORFS requirements are less stringent may be beneficial in increasing minimum ORFS margins.

Figure 3:
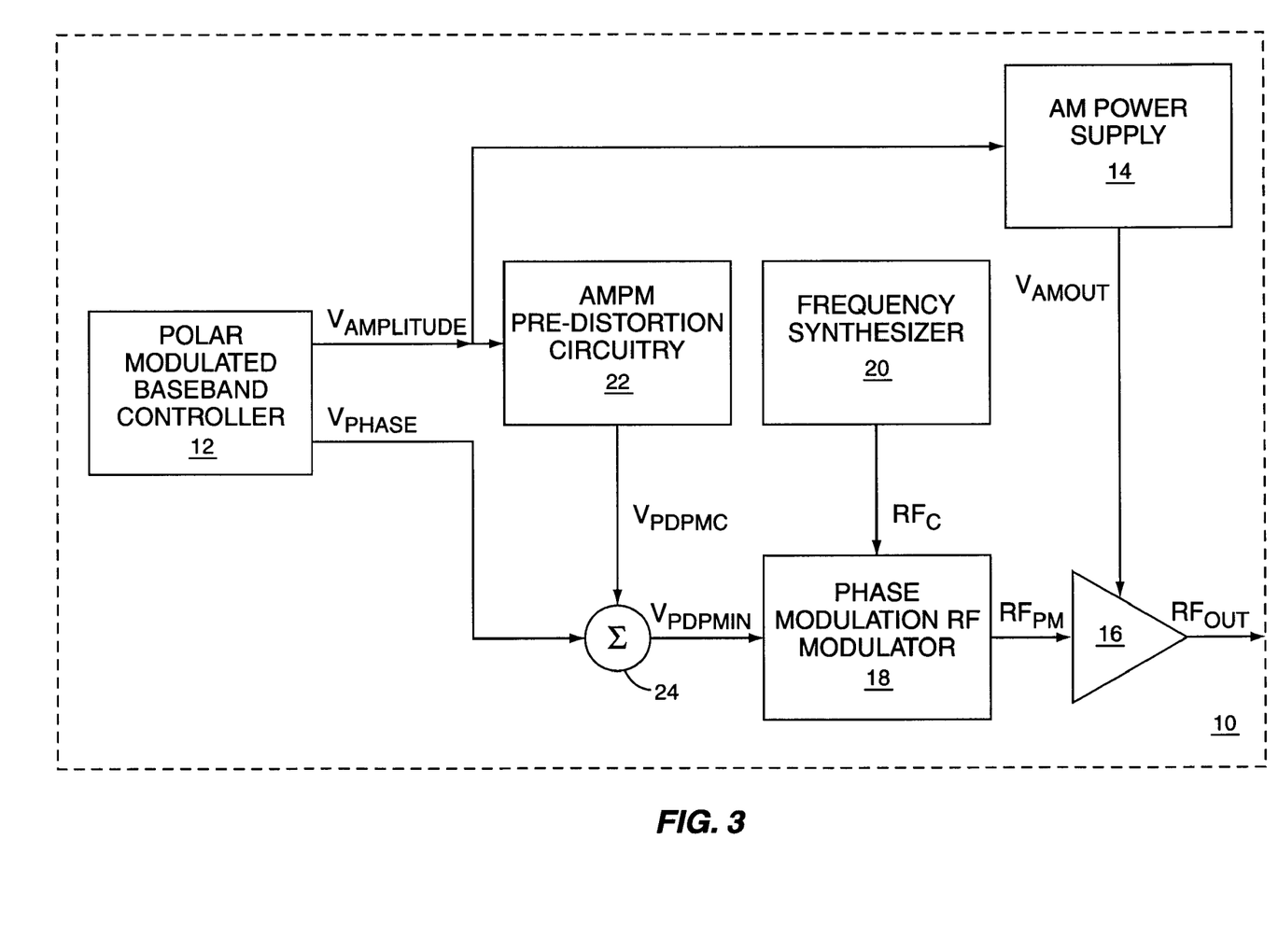
FIG. 3 shows one embodiment of the present invention, wherein AMPM compensation circuitry is added to the polar modulated RF transmitter illustrated in FIG. 1.

FIG. 3 shows one embodiment of the present invention, wherein AMPM compensation is provided by adding AMPM pre-distortion circuitry 22 and a PM pre-distortion summing circuit 24 to the polar modulated RF transmitter 10 illustrated in FIG. 1. The AMPM pre-distortion circuitry 22 receives the AM control signal $V_{AMPLITUDE}$ and provides a pre-distortion PM correction signal $V_{PDPMC}$ to the PM pre-distortion summing circuit 24. The PM pre-distortion summing circuit 24 adds the pre-distortion PM correction signal $V_{PDPMC}$ to the PM control signal $V_{PHASE}$ to create a pre-distorted PM control signal $V_{PDPMIN}$, which is provided to the phase modulation RF modulator 18. The pre-distorted PM control signal $V_{PDPMIN}$ is used to phase modulate the RF carrier signal $RF_C$ to create the RF output signal $RF_{OUT}$. The pre-distortion PM correction signal $V_{PDPMC}$ is based on the AM control signal $V_{AMPLITUDE}$ and AMPM calibration constants. The AMPM calibration constants may include AMPM pre-distortion coefficients, which are used with polynomials to determine the pre-distortion PM correction signal $V_{PDPMC}$. In an alternate embodiment of the present invention, the PM pre-distortion summing circuit 24 may be replaced with other circuitry to combine the pre-distortion PM correction signal $V_{PDPMC}$ and the PM control signal $V_{PHASE}$ to create the pre-distorted PM control signal $V_{PDPMIN}$.

Figure 4:
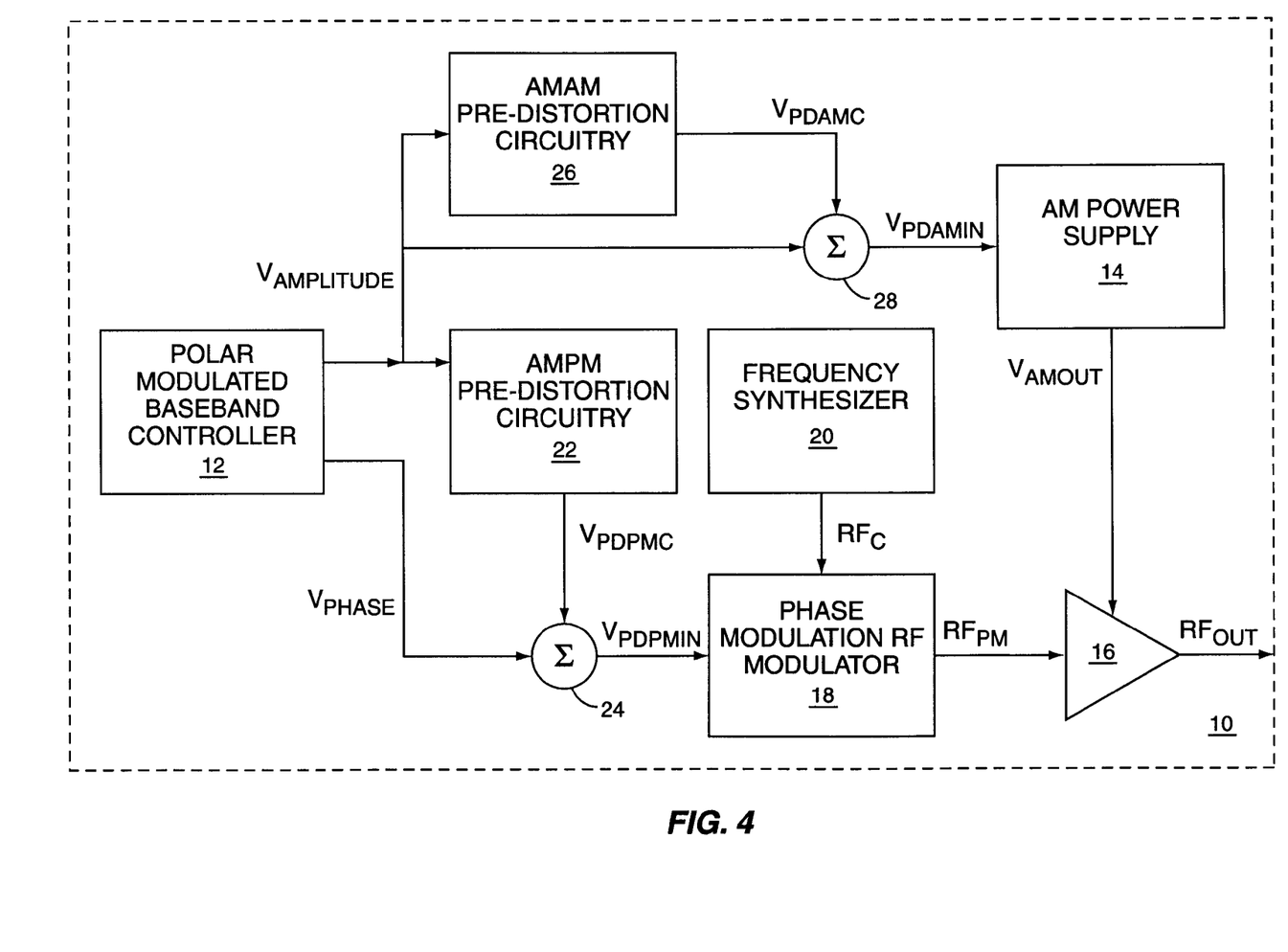
FIG. 4 shows AMAM compensation circuitry added to the polar modulated RF transmitter illustrated in FIG. 3.

FIG. 4 shows one embodiment of the present invention, wherein AMAM compensation is provided by adding AMAM pre-distortion circuitry 26 and an AM pre-distortion summing circuit 28 to the polar modulated RF transmitter 10 illustrated in FIG. 3. The AMAM pre-distortion circuitry 26 receives the AM control signal $V_{AMPLITUDE}$ and provides a pre-distortion AM correction signal $V_{PDAMC}$ to the AM pre-distortion summing circuit 28. The AM pre-distortion summing circuit 28 adds the pre-distortion AM correction signal $V_{PDAMC}$ to the AM control signal $V_{AMPLITUDE}$ to create a pre-distorted AM control signal $V_{PDAMIN}$, which is provided to the AM power supply 14. The AM power supply 14 provides a pre-distorted AM supply voltage $V_{AMOUT}$ to the RF power amplifier 16. The pre-distorted AM supply voltage $V_{AMOUT}$ may be proportional to the pre-distorted AM control signal $V_{PDAMIN}$. The pre-distortion AM correction signal $V_{PDAMC}$ is based on the AM control signal $V_{AMPLITUDE}$ and AMAM calibration constants. The AMAM calibration constants may include AMAM pre-distortion coefficients, which may be used with polynomials to determine the pre-distortion AM correction signal $V_{PDAMC}$. In an alternate embodiment of the present invention, the AM pre-distortion summing circuit 28 may be replaced with other circuitry to combine the pre-distortion AM correction signal $V_{PDAMC}$ and the AM control signal $V_{AMPLITUDE}$ to create the pre-distorted AM control signal $V_{PDAMIN}$.

Figure 5:
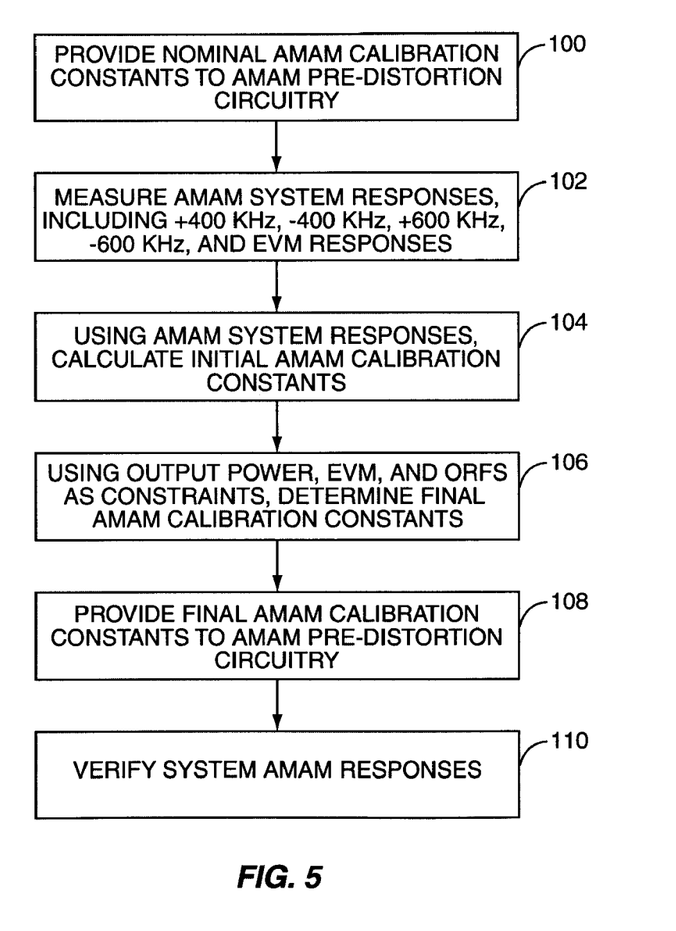
FIG. 5 shows a method for calibrating the AMAM compensation circuitry illustrated in FIG. 4.

FIG. 5 illustrates an exemplary method for calibrating the AMAM pre-distortion circuitry 26 illustrated in FIG. 4. This AMAM pre-distortion calibration method is used to determine AMAM calibration constants that produce desired AM behavior during normal operation of the polar modulated RF transmitter 10. The AMAM calibration constants may used to compensate for amplitude non-linearities or other amplitude characteristics.

First, nominal AMAM calibration constants are provided to the AMAM pre-distortion circuitry 26 (Step 100). Using the nominal AMAM calibration constants, AMAM system responses are measured (Step 102), which includes measuring the amplitude and frequency distribution of the RF output signal $RF_{OUT}$ at different values of the AM control signal $V_{AMPLITUDE}$. Amplitudes of the RF output signal $RF_{OUT}$ at +400 Khz, −400 Khz, +600 Khz, and −600 Khz from at least one transmit center frequency may be measured to determine ORFS margins. Correlations between different values of the AM control signal $V_{AMPLITUDE}$ and corresponding amplitudes of the RF output signal $RF_{OUT}$ may be measured to determine EVM margins. In one embodiment of the present invention, a peak amplitude, an average amplitude, an intermediate amplitude, and a minimum amplitude of the RF output signal $RF_{OUT}$ may be measured.

Using the measured AMAM system responses, initial AMAM calibration constants are calculated (Step 104). In one embodiment of the present invention, a least squares fit that correlates the AM control signal $V_{AMPLITUDE}$ to the amplitude of the RF output signal $RF_{OUT}$ is used to determine the initial AMAM calibration constants. The initial AMAM calibration constants may include initial AMAM pre-distortion coefficients, which may be used with polynomials to determine the pre-distortion AM correction signal $V_{PDAMC}$. In one embodiment of the present invention, third order polynomials may be used. Using the measured AMAM system responses and the initial AMAM calibration constants, and using output power, EVM, and ORFS as constraints, final AMAM calibration constants are then determined (Step 106).

The final AMAM calibration constants are provided to the AMAM pre-distortion circuitry 26 (Step 108). In one embodiment of the present invention, AMAM system responses are verified using the final AMAM calibration constants (Step 110).

Figure 6:
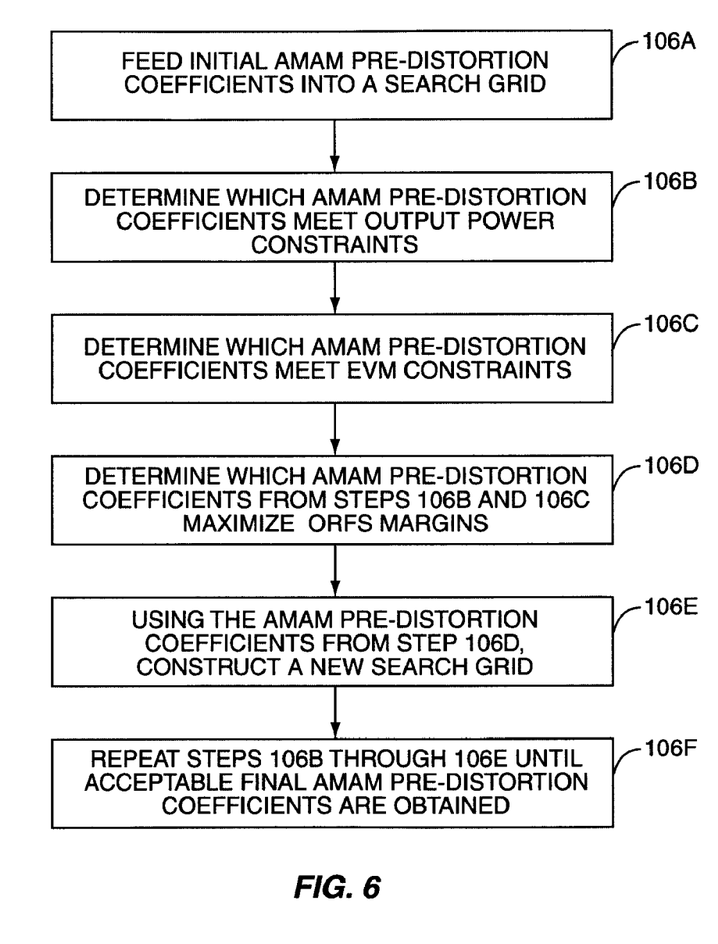
FIG. 6 shows details of one of the calibration steps illustrated in FIG. 5.

FIG. 6 shows sub-steps of Step 106 illustrated in FIG. 5 in an exemplary embodiment of the present invention, wherein the AMAM calibration constants include AMAM pre-distortion coefficients, which are used with polynomials to determine the pre-distortion AM correction signal $V_{PDAMC}$. All of the sub-steps of Step 106 are calculations and/or data manipulations of data from other steps or sub-steps in the AMAM pre-distortion calibration method. First, initial AMAM pre-distortion coefficients are fed into a search grid (Step 106A). The search grid is searched to determine which AMAM pre-distortion coefficients meet output power constraints (Step 106B). The search grid is then searched to determine which AMAM pre-distortion coefficients meet EVM constraints (Step 106C). The search grid is next searched to determine which AMAM pre-distortion coefficients meet output power constraints, meet EVM constraints, and maximize ORFS margins (Step 106D). Using the AMAM pre-distortion coefficients from Step 106D, a new search grid is constructed (Step 106E). Steps 106B through 106E are repeated until acceptable final AMAM pre-distortion coefficients are obtained (Step 106F).

Figure 7:
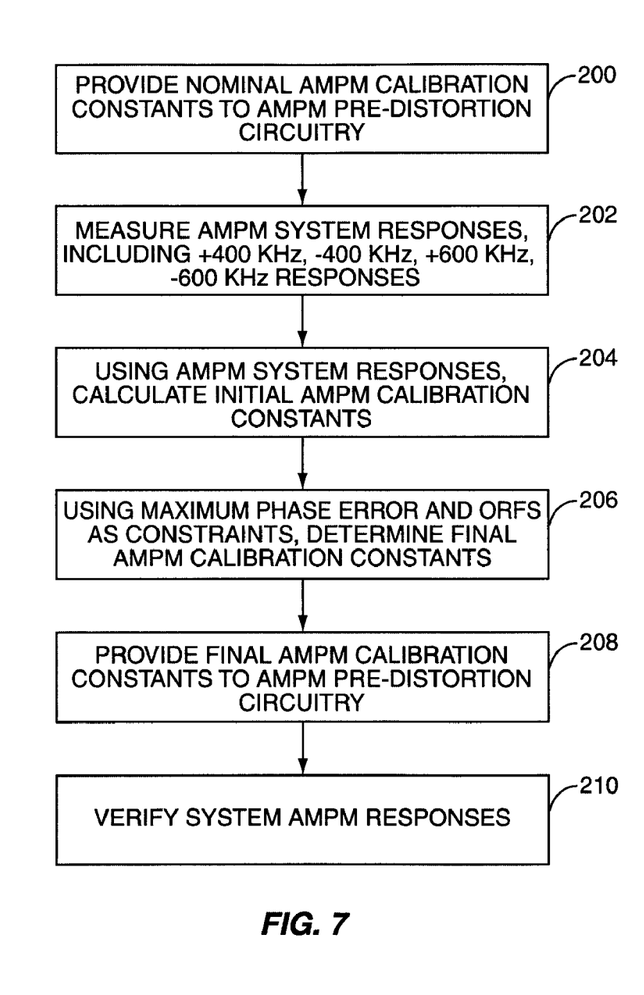
FIG. 7 shows a method for calibrating the AMPM compensation circuitry illustrated in FIG. 4.

FIG. 7 shows a method for calibrating the AMPM pre-distortion circuitry 22 illustrated in FIG. 4. This AMPM pre-distortion calibration method is used to determine AMPM calibration constants that produce desired PM behavior during normal operation of the polar modulated RF transmitter 10. The AMPM calibration constants may be used to eliminate or modify the points of inflection illustrated in FIG. 2B, compensate for noise or drift effects, compensate for PLL distortions, re-distribute the frequency spectrum of the RF output signal $RF_{OUT}$ to increase ORFS margins, or any combination thereof.

First, nominal AMPM calibration constants are provided to the AMPM pre-distortion circuitry 22 (Step 200). Using the nominal AMPM calibration constants, AMPM system responses are measured (Step 202), which includes measuring the amplitude, phase, and frequency distribution of the RF output signal $RF_{OUT}$ at different values of the AM control signal $V_{AMPLITUDE}$. Amplitudes of the RF output signal $RF_{OUT}$ at +400 Khz, −400 Khz, +600 Khz, and −600 Khz from at least one transmit center frequency may be measured to determine ORFS margins. In systems with AMAM pre-distortion circuitry 26, nominal AMAM calibration constants or final AMAM calibration constants may be provided to the AMAM pre-distortion circuitry 26 before measuring the AMPM system responses.

Using the measured AMPM system responses, initial AMPM calibration constants are calculated (Step 204). In one embodiment of the present invention, a statistical fit that minimizes phase error variance is used to determine the initial AMPM calibration constants. The initial AMPM calibration constants may include initial AMPM pre-distortion coefficients, which may be used with polynomials to determine the pre-distortion AM correction signal $V_{PDAMC}$. In one embodiment of the present invention, third order polynomials may be used. Using the measured AMPM system responses and the initial AMPM calibration constants, and using maximum phase error and ORFS as constraints, final AMPM calibration constants are then determined (Step 206). The final AMPM calibration constants are provided to the AMPM pre-distortion circuitry 22 (Step 208). In one embodiment of the present invention, AMPM system responses are verified using the final AMPM calibration constants (Step 210).

Figure 8:
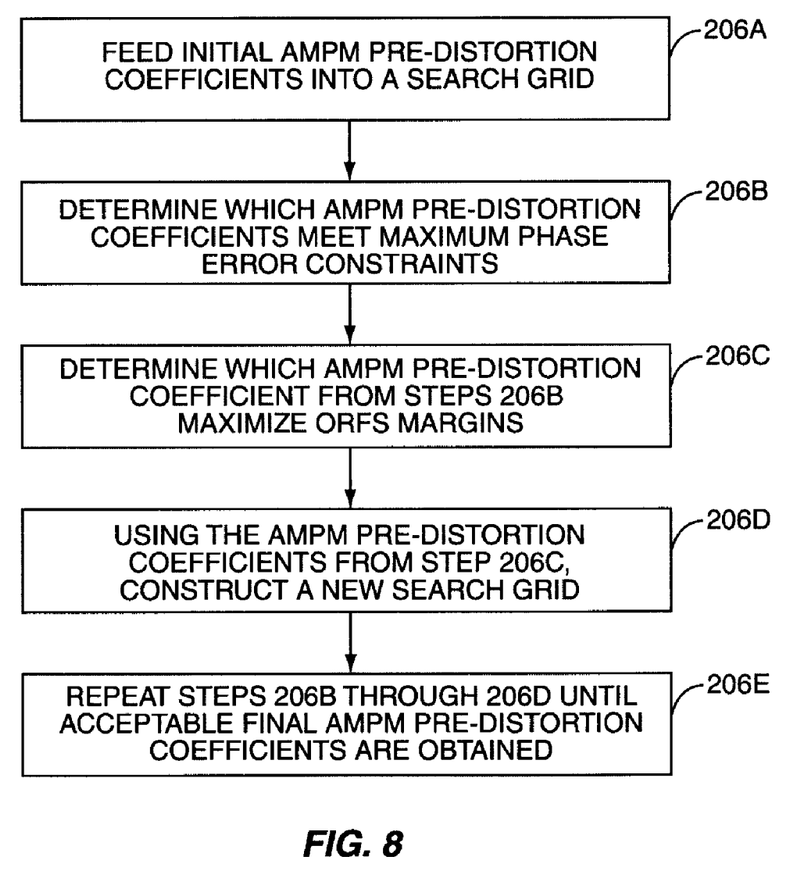
FIG. 8 shows details of one of the calibration steps illustrated in FIG. 7.

FIG. 8 shows sub-steps of Step 206 illustrated in FIG. 7 in an exemplary embodiment of the present invention, wherein the AMPM calibration constants include AMPM pre-distortion coefficients, which are used with polynomials to determine the pre-distortion PM correction signal $V_{PDPMC}$. All of the sub-steps of Step 206 are calculations and/or data manipulations of data from other steps or sub-steps in the AMPM pre-distortion calibration method. First, initial AMPM pre-distortion coefficients are fed into a search grid (Step 206A). The search grid is searched to determine which AMPM pre-distortion coefficients meet maximum phase error constraints (Step 206B). The search grid is then searched to determine which AMPM pre-distortion coefficients meet maximum phase error constraints and maximize ORFS margins (Step 206C). Using the AMPM pre-distortion coefficients from Step 206C, a new search grid is constructed (Step 206D). Steps 206B through 206D are repeated until acceptable final AMPM pre-distortion coefficients are obtained (Step 206E).

The AMAM pre-distortion calibration method, the AMPM pre-distortion calibration method, or both, may be used in a production environment, a field service environment, or in any other setting suitable for calibrating the polar modulated RF transmitter 10. A detailed code listing of an AMAM pre-distortion calibration method and an AMPM pre-distortion calibration method using MATLAB code are incorporated by reference. MATLAB is a high-level programming language that may be more effective for certain computationally intensive tasks than other programming languages. MATLAB is a proprietary product of a company called The MathWorks. Although this detailed application example illustrates the AMAM and AMPM calibration methods using MATLAB, it should be apparent to one of ordinary skill in the art that any number of programming languages may be used to practice the invention.

Figure 9:
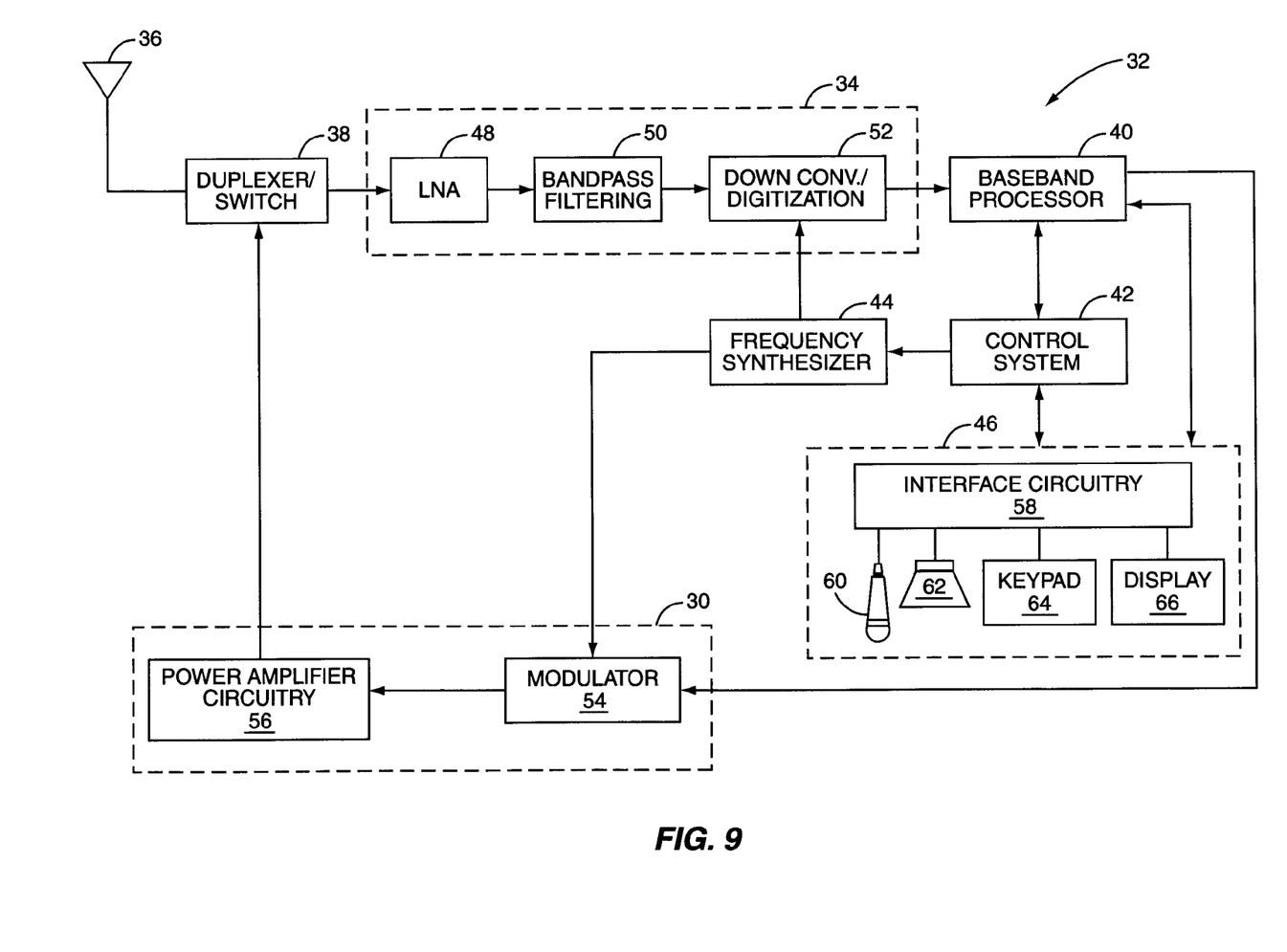
FIG. 9 shows an application example of the present invention used in a mobile terminal.

An application example of a phase distortion compensated polar modulated RF transmitter 30 is its use in a mobile terminal 32. The basic architecture of the mobile terminal 32 is represented in FIG. 9 and may include a receiver front end 34, the polar modulated RF transmitter 30, an antenna 36, a duplexer or switch 38, a baseband processor 40, a control system 42, a frequency synthesizer 44, and an interface 46. The receiver front end 34 receives information bearing radio frequency signals from one or more remote transmitters provided by a base station. A low noise amplifier (LNA) 48 amplifies the signal. A filter circuit 50 minimizes broadband interference in the received signal, while down conversion and digitization circuitry 52 down converts the filtered, received signal to an intermediate or baseband frequency signal, which is then digitized into one or more digital streams. The receiver front end 34 typically uses one or more mixing frequencies generated by the frequency synthesizer 44. The baseband processor 40 processes the digitized received signal to extract the information or data bits conveyed in the received signal. This processing typically comprises demodulation, decoding, and error correction operations. As such, the baseband processor 40 is generally implemented in one or more digital signal processors (DSPs).

On the transmit side, the baseband processor 40 receives digitized data, which may represent voice, data, or control information, from the control system 42, which it encodes for transmission. The encoded data is output to the polar modulated RF transmitter 30, where it is used by a modulator 54 to modulate a carrier signal that is at a desired transmit frequency. Power amplifier circuitry 56 amplifies the modulated carrier signal to a level appropriate for transmission, and delivers the amplified and modulated carrier signal to the antenna 36 through the duplexer or switch 38.

A user may interact with the mobile terminal 32 via the interface 46, which may include interface circuitry 58 associated with a microphone 60, a speaker 62, a keypad 64, and a display 66. The interface circuitry 58 typically includes analog-to-digital converters, digital-to-analog converters, amplifiers, and the like. Additionally, it may include a voice encoder/decoder, in which case it may communicate directly with the baseband processor 40. The microphone 60 will typically convert audio input, such as the user's voice, into an electrical signal, which is then digitized and passed directly or indirectly to the baseband processor 40. Audio information encoded in the received signal is recovered by the baseband processor 40, and converted by the interface circuitry 58 into an analog signal suitable for driving the speaker 62. The keypad 64 and display 66 enable the user to interact with the mobile terminal 32, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

Code Listing

This patent application includes a code listing appendix entitled CODE LISTING APPENDIX FOR METHOD FOR CALIBRATING A PHASE DISTORTION COMPENSATED POLAR MODULATED RADIO FREQUENCY TRANSMITTER, which is concurrently filed herewith and incorporated by reference in its entirety and forms part of the specification and teachings herein.

What is claimed is:

1. A method for calibrating a polar modulated radio frequency (RF) transmitter comprising:
receiving an amplitude modulated (AM) supply signal based on a first AM signal;
receiving a first baseband phase modulated (PM) signal;
providing a second baseband PM signal based on the first AM signal, the first baseband PM signal, and AMPM calibration constants;
providing a PM RF signal based on the second baseband PM signal;
providing a polar modulated RF output signal based on the AM supply signal and the PM RF signal;
providing nominal AMPM calibration constants for calibrating the polar modulated RF transmitter;
characterizing AMPM system responses based on at least one of a group consisting of an amplitude of the polar modulated RF output signal, a phase of the polar modulated RF output signal, and a frequency distribution of the polar modulated RF output signal at different values of the first AM signal; and
calculating final AMPM calibration constants based on the AMPM system responses using phase error constraints, wherein the calculating the final AMPM calibration constants further uses output RF spectrum (ORFS) constraints,
wherein the AMPM calibration constants comprise polynomial coefficients used with polynomials, and the calculating the final AMPM calibration constants further comprises:
feeding initial polynomial coefficients into a search grid;

identifying intermediate polynomial coefficients by determining which polynomial coefficients in the search grid meet the phase error constraints and maximize ORFS margins;
updating the search grid with the intermediate polynomial coefficients; and
repeating the identifying step and the updating step until final polynomial coefficients are determined.

2. The method of claim 1 wherein calculating final AMPM calibration constants comprises
iteratively calculating final AMPM calibration constants.

3. The method of claim 1 wherein the characterizing AMPM system responses is further based on the amplitude of the polar modulated RF output signal at a transmit carrier frequency (TCF) selected from a group consisting of an approximate center frequency of an adjacent channel, an approximate center frequency of an alternate channel, and an approximate center frequency of a channel in an alternate system.

4. The method of claim 3 wherein the characterizing the AMPM system responses is further based on the amplitude of the polar modulated RF output signal at a frequency selected from a group consisting of an approximate sum of a transmit carrier frequency (TCF) and 400 kilohertz (Khz), an approximate sum of the TCF and −400 Khz, an approximate sum of the TCF and 600 Khz, and an approximate sum of the TCF and −600 Khz.

5. The method of claim 1 wherein the ORFS margins comprise at least one ORFS margin at a frequency of the polar modulated RF output signal selected from a group consisting of an approximate center frequency of an adjacent channel, an approximate center frequency of an alternate channel, and an approximate center frequency of a channel in an alternate system.

6. The method of claim 5 wherein the ORFS margins further comprise at least one ORFS margin at a frequency of the polar modulated RF output signal selected from a group consisting of an approximate sum of a transmit carrier frequency (TCF) and 400 kilohertz (Khz), an approximate sum of the TCF and −400 Khz, an approximate sum of the TCF and 600 Khz, and an approximate sum of the TCF and −600 Khz.

7. The method of claim 1 wherein the calculating the final AMPM calibration constants further uses initial AMPM calibration constants, wherein the initial AMPM calibration constants are calculated based on the AMPM system responses.

8. The method of claim 1 further comprising providing the final AMPM calibration constants to the polar modulated RF transmitter.

9. The method of claim 1 further comprising
providing the final AMPM calibration constants to the polar modulated RF transmitter; and
verifying the final AMPM calibration constants by measuring at least one of the group consisting of the amplitude of the polar modulated RF output signal, the phase of the polar modulated RF output signal, and the frequency distribution of the polar modulated RF output signal at different values of the first AM signal.

10. A method for calibrating a polar modulated radio frequency (RF) transmitter comprising:
receiving an amplitude modulated (AM) supply signal based on a first AM signal and AMAM calibration constants;
receiving a first baseband phase modulated (PM) signal;
providing a second baseband PM signal based on the first AM signal, the first baseband PM signal, and AMPM calibration constants;
providing a PM RF signal based on the second baseband PM signal;
providing a polar modulated RF output signal based on the AM supply signal and the PM RF signal;
providing nominal AMAM calibration constants for calibrating the polar modulated RF transmitter;
characterizing AMAM system responses based on at least one of a group consisting of an amplitude of the polar modulated RF output signal and a frequency distribution of the polar modulated RF output signal at different values of the first AM signal; and
calculating final AMAM calibration constants based on the AMAM system responses using output power constraints, wherein the calculating the final AMAM calibration constants further uses at least one of a group consisting of output RF spectrum (ORFS) constraints and error vector magnitude (EVM) constraints
wherein calculating the final AMAM calibration constants further comprises:
feeding initial polynomial coefficients into a search grid;
identifying intermediate polynomial coefficients by determining which polynomial coefficients in the search grid meet the output power constraints and EVM constraints and maximize ORFS margins;
updating the search grid with the intermediate polynomial coefficients; and
repeating the identifying step and updating step until final polynomial coefficients are determined.

11. The method of claim 10
wherein the AMAM calibration constants comprise polynomial coefficients used with polynomials.

12. The method of claim 10 wherein the characterizing the AMAM system responses is further based on the amplitude of the polar modulated RF output signal at a transmit carrier frequency (TCF) selected from a group consisting of an approximate center frequency of an adjacent channel, an approximate center frequency of an alternate channel, and an approximate center frequency of a channel in an alternate system.

13. The method of claim 12 wherein the characterizing the AMAM system responses is further based on the amplitude of the polar modulated RF output signal at a frequency specified by a group consisting of an approximate sum of a transmit carrier frequency (TCF) and 400 kilohertz (Khz), an approximate sum of the TCF and −400 Khz, an approximate sum of the TCF and 600 Khz, and an approximate sum of the TCF and −600 Khz.

14. The method of claim 10 wherein the ORFS margins comprise at least one ORFS margin at a frequency of the polar modulated RF output signal selected from a group consisting of an approximate center frequency of an adjacent channel, an approximate center frequency of an alternate channel, and an approximate center frequency of a channel in an alternate system.

15. The method of claim 14 wherein the ORFS margins further comprise at least one ORFS margin at a frequency of the polar modulated RF output signal selected from a group consisting of an approximate sum of a transmit carrier frequency (TCF) and 400 kilohertz (Khz), an approximate sum of the TCF and −400 Khz, an approximate sum of the TCF and 600 Khz, and an approximate sum of the TCF and −600 Khz.

16. The method of claim 10 wherein the calculating the final AMAM calibration constants further uses initial AMAM calibration constants, wherein the initial AMAM calibration constants are calculated based on the AMAM system responses.

17. The method of claim 10 further comprising providing the final AMAM calibration constants to the polar modulated RF transmitter.

18. The method of claim 17 further comprising verifying the final AMAM calibration constants by measuring at least one of the group consisting of the amplitude of the polar modulated RF output signal and the frequency distribution of the polar modulated RF output signal at different values of the first AM signal.

19. The method of claim 10 further comprising:
providing nominal AMPM calibration constants for calibrating the polar modulated RF transmitter;
characterizing AMPM system responses based on at least one of a group consisting of an amplitude of the polar modulated RF output signal, a phase of the polar modulated RF output signal, and a frequency distribution of the polar modulated RF output signal at different values of the first AM signal; and
calculating final AMPM calibration constants based on the AMPM system responses using phase error constraints.

20. The method of claim 10 wherein the characterizing the AMAM system responses is further based on at least one selected from a group consisting of a peak amplitude of the polar modulated RF output signal, an average amplitude of the polar modulated RF output signal, an intermediate amplitude of the polar modulated RF output signal, and a minimum amplitude of the polar modulated RF output signal.

* * * * *